US005249027A

United States Patent [19]

Mathur et al.

[11] Patent Number: 5,249,027

[45] Date of Patent: Sep. 28, 1993

[54] INTER-VEHICLE DISTANCE MEASURING SYSTEM

[75] Inventors: Bimal P. Mathur; H. Taichi Wang, both of Thousand Oaks, Calif.

[73] Assignee: Rockwell International Corporation, Seal Beach, Calif.

[21] Appl. No.: 851,438

[22] Filed: Mar. 16, 1992

[51] Int. Cl.[5] .......................... G01C 3/00; B60T 7/16; G08G 1/123

[52] U.S. Cl. .......................................... 356/1; 180/167; 340/988; 356/4

[58] Field of Search ........................ 340/988; 356/1, 4; 180/167

[56] References Cited

U.S. PATENT DOCUMENTS

| | | | |
|---|---|---|---|
| 3,152,317 | 10/1964 | Mayer . | |
| 3,340,763 | 9/1967 | Power . | |
| 3,892,483 | 7/1975 | Saufferer | 356/4 |
| 4,934,477 | 6/1990 | Dai | 180/169 |
| 5,164,732 | 11/1992 | Brockelsby | 342/44 |
| 5,166,533 | 11/1992 | Kajiwara | 356/4 |

*Primary Examiner*—Stephen C. Buczinski
*Attorney, Agent, or Firm*—John C. McFarren

[57] ABSTRACT

A system of active emitters and sensors is provided for measuring distance and communicating between vehicles on an automated highway. The preferred system utilizes a pair of spaced apart sensors at the front of each vehicle for stereo depth perception, two temporally modulated emitters on the rear of each vehicle for redundancy and inter-vehicle communication, and temporally modulated emitters positioned at intervals along the highway for communication from the highway to the vehicles. The emitters may transmit radiation at a wavelength, such as 1 μm IR, for example, that can be detected by low cost detectors. The emitters are modulated temporally to transmit a binary code, resulting in signal-to-noise improvement and increased clutter rejection and operational range. Each sensor may include an array of IR detectors and associated readout circuitry, an imaging lens, a lens array for improving detector fill factor, a filter and polarizer to reject clutter and reduce noise, and a cylindrical lens to provide a good vertical field of view. Detector charge integration is controlled by the binary code of the emitters and depends on the code length and local background illumination. The sensors are connected to a computer processor for processing data received from the emitters and computing distance between vehicles.

19 Claims, 3 Drawing Sheets

INTER-VEHICLE DISTANCE MEASURING SYSTEM

TECHNICAL FIELD

The present invention relates to distance measuring devices and, in particular, to an active infrared emitting and receiving system for measuring distance and communicating between automotive vehicles.

BACKGROUND OF THE INVENTION

Reducing congestion on the highways has been a goal for many years. One possible solution is to make existing highways more efficient through automation. To be safe and effective, however, automated highways require some means for maintaining optimum distance between vehicles. This requires measuring distances between vehicles and establishing communication links between vehicles and the highway and/or among vehicles traveling on the highway.

Measuring and maintaining distances between vehicles on an automated highway, such as the proposed Intelligent Vehicle Highway System (IVHS), is complicated by the clutter of unwanted information from the environment that is continually received by the sensor system. Provisions must be made for system calibration, changing weather, vehicles entering and exiting the highway, and numerous other obstacles that might be encountered. Various systems, including those employing active sensors, such as those based on mm wave radar, laser radar, and sonar, or passive systems, such as those based on stereo vision, have been proposed for measuring distance between vehicles on automated highways. The known systems, however, have high cost factors and/or technical problems that have not been overcome. Given the foregoing constraints and the desire to develop automated highways, there is a clear need for an effective system for measuring and maintaining distance between automotive vehicles that performs safely and efficiently at a satisfactory level of cost.

SUMMARY OF THE INVENTION

The present invention comprises a system of active light emitters and synchronized sensors employed with an automated highway for measuring distance and communicating between vehicles. In the preferred embodiment, the system utilizes a pair of spaced apart sensors at the front of each vehicle for stereo depth perception, two temporally modulated emitters on the rear of each vehicle for distance measuring redundancy and inter-vehicle communication, and temporally modulated emitters positioned at intervals along the highway for communication from the highway to the vehicles.

The emitters of the present invention transmit light at a wavelength, such as 1 μm infrared, for example, which is detectable by common devices (such as silicon diodes) that can be mass produced at low cost. The emitters transmit a temporally modulated binary code that is received by a synchronized sensor, resulting in signal-to-noise improvement, clutter rejection, and increased operational range. Two distinctly coded emitters on the rear of each vehicle provide distance measuring redundancy. An additional feature of the invention is that the active emitters and sensors used for distance measurement may also be used for inter-vehicle communication.

The sensors of the present invention comprise a one- or two-dimensional array of detectors. Each sensor may include an array of IR detectors and associated readout circuitry, a lens system for imaging the emitters on the detectors, and a filter and polarizer to reject clutter and reduce noise. Charge integration by the detectors is controlled by the binary code of the emitters and depends on the code length and local background illumination. The use of two spaced-apart sensors on the front of each vehicle provides stereo imaging that is used for computing the distance to an emitter on the rear of another vehicle. The sensors may be connected to a computer system for processing data received from the emitters.

A principal object of the invention is to enable vehicles to establish and maintain a desired following distance on an automated highway. A feature of the invention is the use of active, temporally modulated light emitters on the rear of each vehicle and synchronized sensors on the front of each vehicle. Advantages of the invention are improved signal-to-noise ratio, increased range of detection, and improved clutter rejection in a system for measuring distance between automotive vehicles.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

The present invention comprises a method and apparatus for measuring distance and communicating between vehicles on an automated, intelligent vehicle highway system. A basic embodiment of the system includes at least one active, temporally modulated light emitter mounted on the rear of each vehicle and at least two spaced apart, synchronized sensors mounted on the front of each vehicle. Alternatively, the system may include at least two active, spaced apart, temporally modulated light emitters mounted on the rear of each vehicle and at least one synchronized sensor mounted on the front of each vehicle.

Figure 1:
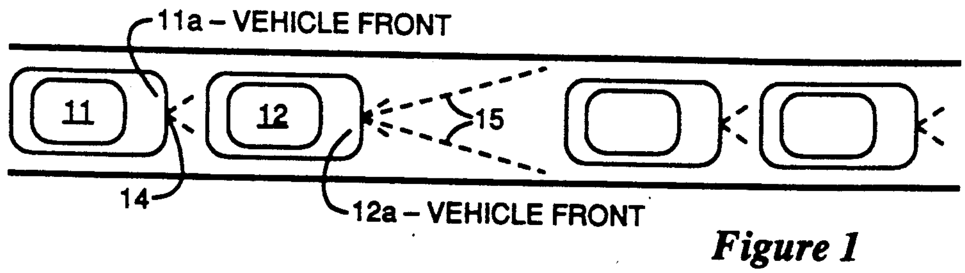
FIG. 1 is a schematic diagram of vehicles having distance measuring sensors traveling on an automated highway.

The concept of an intelligent vehicle highway system (IVHS) is illustrated schematically in FIG. 1. Each vehicle on the highway, such as vehicle 11 having a front 11*a* is equipped with means 14 for sensing the presence of another vehicle ahead of it, such as vehicle 12 having a front 12*a*. The highway system must include means for ensuring the calibration of each vehicle's sensor system prior to its entering the automated highway. Ideally, the sensing means of each vehicle includes a computer system for processing sensor data and automatically controlling vehicle 11 to maintain a desired distance behind vehicle 12. A string of vehicles electronically linked together, such as vehicles 11 and 12, forms a platoon that travels as a unit. The sensing means must also include longer range capability, as shown on vehicle 12 having a front 12*a*, for sensing curves of the highway and the rear of another platoon ahead of it. Of course, the processing system must accommodate the breaking and joining of platoons as vehicles enter and depart the automated highway.

Figure 2:
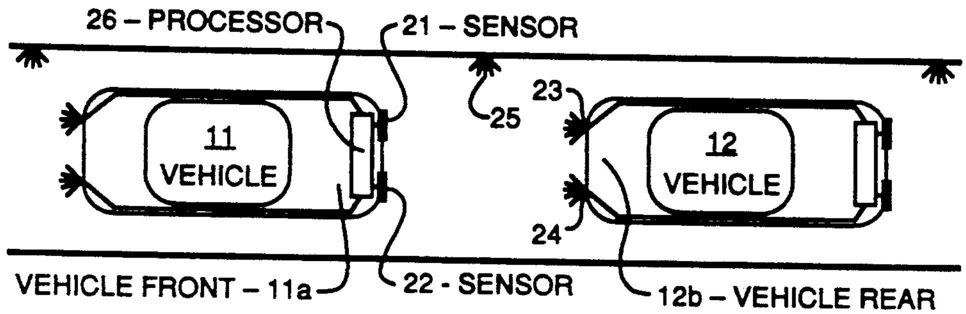
FIG. 2 is a schematic diagram of automotive vehicles having rear mounted active light emitters and front mounted distance measuring sensors of the present invention.

In a preferred embodiment of the present invention illustrated in FIG. 2, the system utilizes a pair of spaced apart sensors 21 and 22 mounted on the front of each vehicle, as shown on the front 11*a* of vehicle 11, and two temporally modulated emitters 23 and 24 mounted on the rear of each vehicle, as shown on the rear 12*b* vehicle 12. Sensors 21 and 22 are mounted a known distance apart as shown on the front 11*a* of vehicle 11, to provide stereo depth perception for calculating distance. Two emitters 23 and 24 are provided for distance measuring redundancy and for inter-vehicle communication. Additional temporally modulated emitters, such as roadside emitter 25, may be positioned at intervals along the highway to provide communication from the highway to the vehicles. Roadside emitters can transmit messages from a central traffic controller, for example, to provide information such as road conditions and accident reports or to instruct vehicles to use longer codes for greater range detection in rain or fog.

Ideally, emitters 23 and 24 generate light output at a wavelength that is not greatly attenuated by the atmosphere. Given the current technology, a good compromise of performance versus cost is IR radiation at about 1 μm, which is generated by GaAs light emitting diodes (LEDs) and detectable by low cost silicon diodes, for example. The present invention functions equally well at other wavelengths, however. For example, infrared radiation in the 1–5 μm band, particularly above about 4 μm, has a significant advantage in fog, but detection of this wavelength band requires specially manufactured detectors that are costly given the present state of the art.

Machine vision systems that rely on stereo perception often have difficulty matching the images detected by the two sensors. The major obstacles are detecting the emitter signal through clutter and noise, forming spatially resolved images of the emitter on both sensors, and matching the gray scale images on the two sensors. Known techniques of image matching include intensity based matching and gradient of intensity matching. A problem with these techniques, however, is that many different and equally good matches may exist.

Figure 3A:
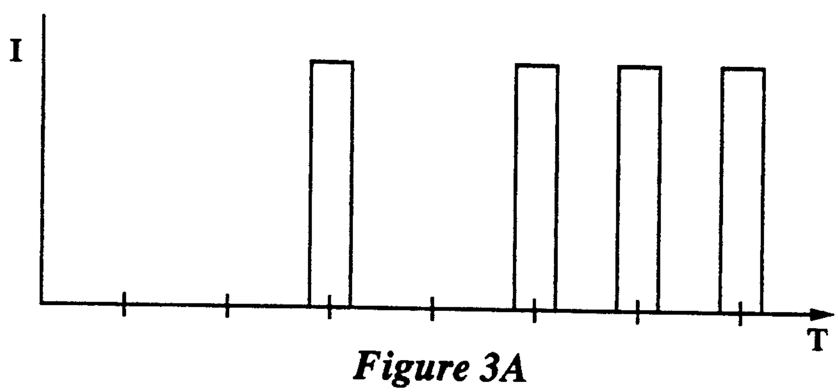
FIGS. 3A and 3B illustrate temporally modulated, pseudo-random pulses of emitted light that represent an example of two orthogonally related 7-bit codes.
Figure 3B:
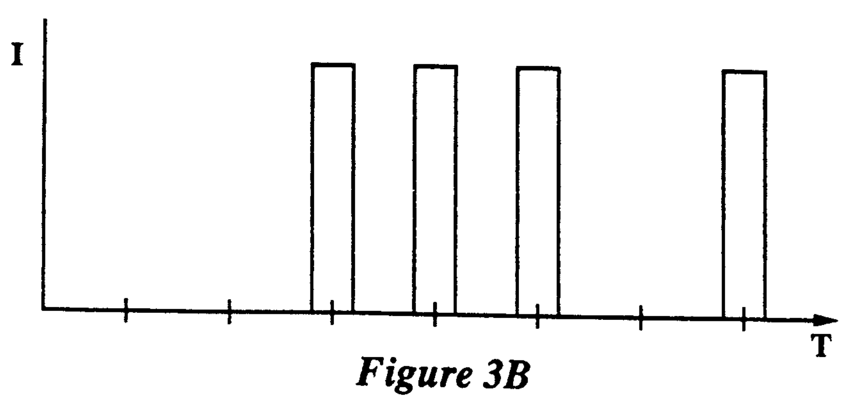

The present invention overcomes image matching problems by temporally modulating emitters 23 and 24 to produce light pulses at a high rate, such as 1 MHz for example as illustrated graphically in FIGS. 3A and 3B that plot light intensity (I) versus time (T). The emitters are modulated to output a pseudo-random code, which sensors 21 and 22 are designed to detect. This coding scheme allows identification of a unique emitter and its location amid clutter from the sun and various reflectors, even in adverse weather. Because the image of each emitter can be identified by its code, a unique match can be obtained for the corresponding images of a given emitter on the two sensors. The coding scheme also allows discrimination between vehicles within the field of view of a sensor if the emitters use different codes. Preferably, the emitter codes are selected from a family of codes so that they are orthogonal to each other as shown in FIGS. 3A and 3B that illustrate two orthogonally related 7-bit codes (0010111 and 0011101) as an example. Using selected codes, a given vehicle can communicate with another vehicle by looking for a particular emitter at a particular location and searching for its code.

Figure 4A:
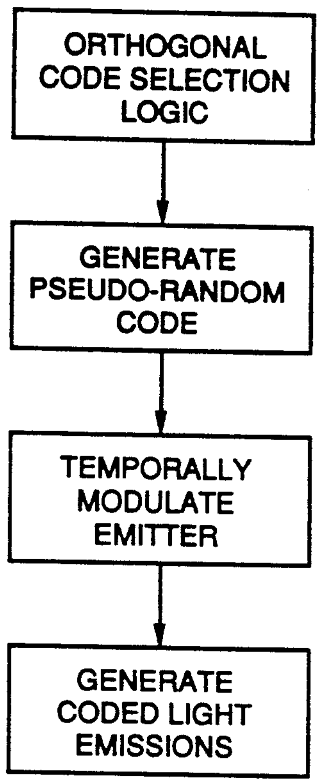
FIGS. 4A and 4B are logic flow diagrams summarizing the basic steps in emitting, detecting, and processing temporally modulated pulses of light in the distance measuring scheme of the present invention.
Figure 4B:
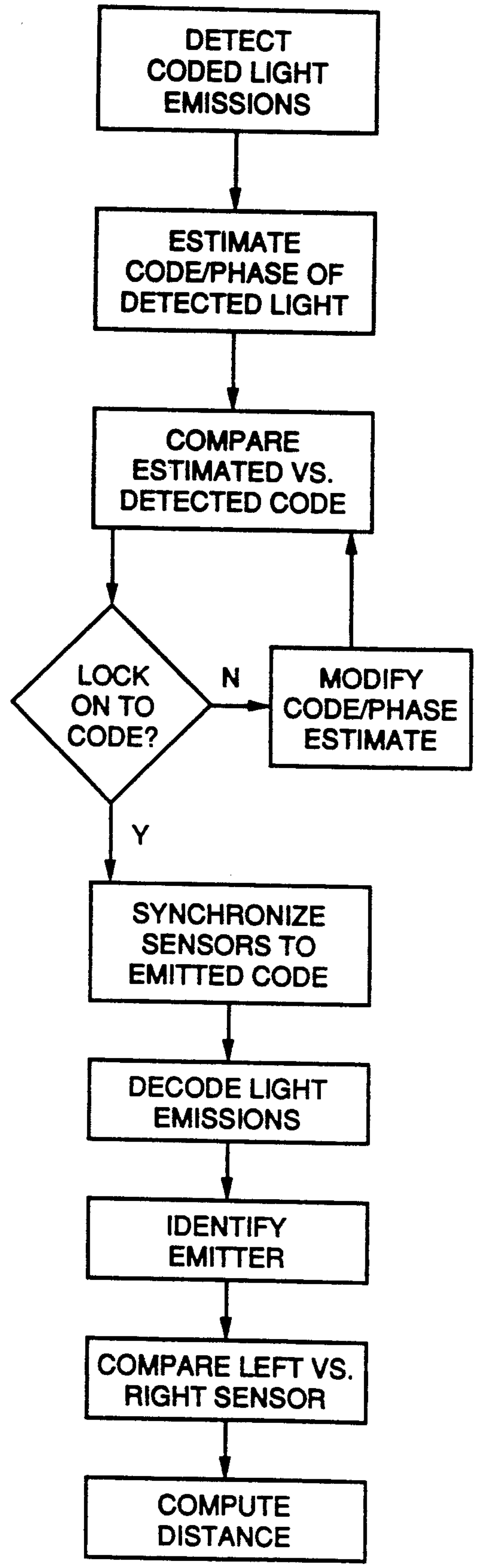

FIG. 4A illustrates the basic steps in generating pseudo-random, temporally modulated pulses of light comprising coded information. Likewise, FIG. 4B is a logic flow diagram illustrating the basic steps in receiving, estimating, and comparing coded light pulses and synchronizing sensors, identifying the emitter, and computing distance to the emitter using the scheme of the present invention. Detector arrays forming the sensors are switched on and off according to the system's best estimate of the code and phase being used, as in a GPS spread spectrum receiver. If there is no detection, the code and phase are changed until a locked, synchronized state is achieved. Because synchronized detectors are essentially "blind" to other than coded emissions, emitters on the vehicle being followed are detected while other sources of light emissions are excluded. When a locked state is achieved, distance measuring and communication between vehicles can take place. Two-way communication can be accomplished by mounting both emitters and sensors on both the front and rear of the vehicles. Spread spectrum coding of emitter output in conjunction with synchronized detectors thus enables identification of individual emitters, improved signal-to-noise performance (including the ability to detect signals below noise level), communication between vehicles, and communication between the highway and vehicles.

Figure 5:
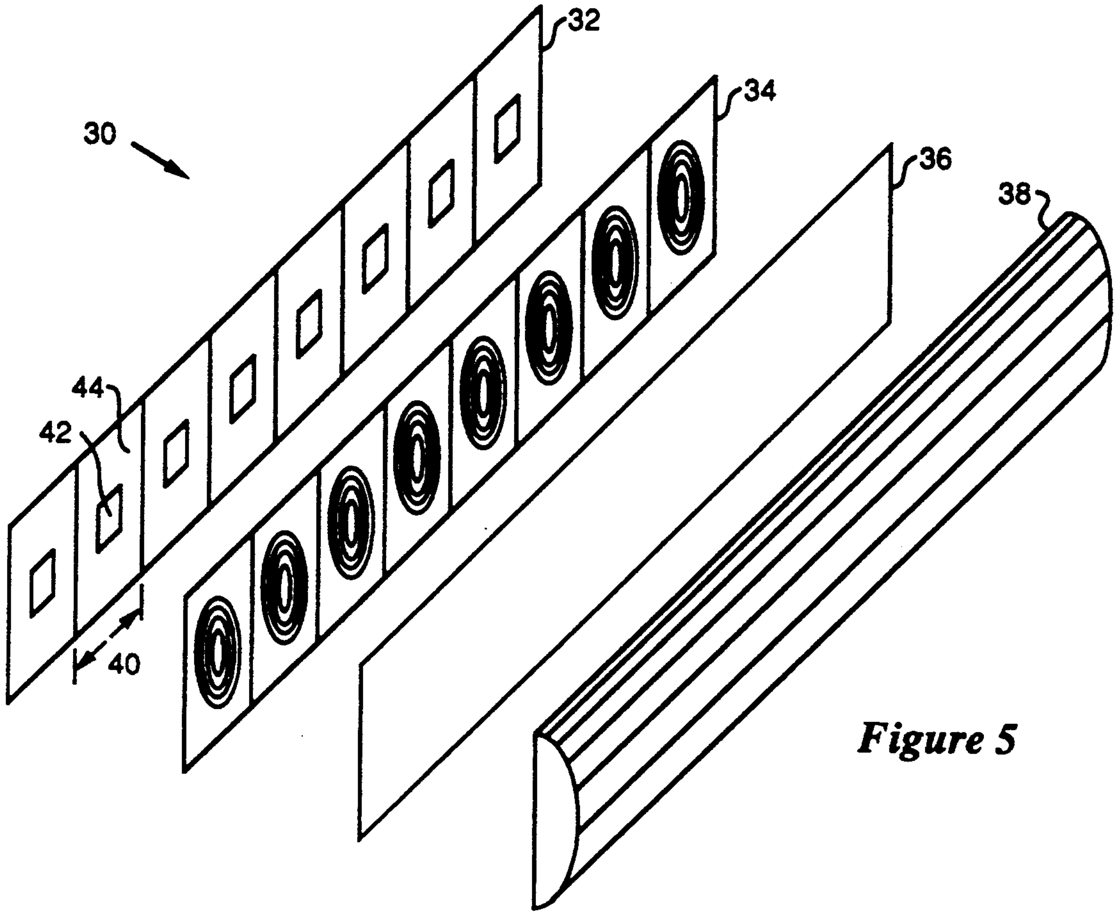
FIG. 5 is an exploded view of a one-dimensional detector and processor array of the present invention.

Sensors 21 and 22 of the present invention comprise one- or two-dimensional arrays of IR detectors. Sensors 21 and 22 are precisely positioned as imaging arrays to form a spatially resolved image of the emitter on each sensor. Precise spatial resolution is required for determining the spatial disparity between the left and right images (i.e., the images on sensors 21 and 22, respectively) for stereo depth perception and computation of the distance to the emitter. An example of a one-dimensional sensor 30 of the present invention is illustrated in FIG. 5. FIG. 5 is a schematic, exploded view of sensor 30 that shows the components of eight pixels of a typically much larger array. The number of pixels in sensor 30 is a function of the range accuracy, baseline width, and field-of-view required by the system. Pixel counts in the 400 to 500 range are typical for each sensor.

Sensor 30 comprises a detector and processor array 32, a lens array 34, a filter and polarizer 36, and an imaging lens 38. Imaging lens 38 may be in the form of a cylindrical lens as illustrated, or it may be a separate lens in addition to a cylindrical lens. Array 32 comprises a plurality of cells, such as cell 40. Cell 40 includes an individual IR detector (or pixel) 42 and associated readout circuitry 44 fabricated on a semiconductor chip, such as silicon, for example. Circuitry 44 typically includes an integrating capacitor and a switch. During the ON period of the emitter code a charge proportional to the incident light intensity is deposited on the capacitor and an equal amount of charge is removed from the capacitor during the OFF period of the code. With this scheme, the average charge accumulation is nearly zero for all pixels except those that are illuminated by an image of a synchronized emitter. Synchronized transmitters and receivers such as this are used extensively for secure communications using encryption. Encryption techniques can be used with the present invention to distinguish between vehicles by uniquely identifying individual emitters, as stated above. In these systems, coherent integration provides a signal-to-noise gain that is proportional to the length of the code. The present invention relies on this fact to improve the range of detection, such as in rain or fog, for example, by increasing the length of the code.

As illustrated in FIG. 5, a lens array 34 may be placed atop detector array 32. Lens array 34 comprises a plurality of lens elements corresponding to the plurality of detectors to increase the pixel fill factor by focusing the received light onto the individual detectors. Filter and polarizer 36 is placed atop lens array 34 to block unwanted radiation from reaching detector array 32. Filter and polarizer 36 comprises a polarizer and a narrow band filter to reject unwanted clutter but adapted to transmit the narrow band IR radiation of known polarization emitted by IR emitters 23 and 24. Cylindrical imaging lens 38 images light from emitters 23 and 24 onto individual pixels while providing a greater vertical field of view. With the combination of cylindrical imaging lens 38 and lens array 34, emitters 23 and 24 are imaged on sensors 21 and 22 at all times during changes in the grade of the highway.

Referring again to FIGS. 2 and 4, each vehicle includes a computer processor, such as processor 26 in vehicle 11, connected to the emitters and sensors of the system. Processor 26 controls the output code of light emitters 23 and 24, including data communications, synchronizes sensors 21 and 22 to the code of the emitters, and processes the data received. With a pair of emitters on the rear of each vehicle 12, emitters 23 and 24 may be individually coded. Similarly, different codes can be used by roadside emitters 25 to distinguish them from vehicle emitters 23 and 24. To determine the distance between vehicles 11 and 12, sensors 21 and 22 on vehicle 11 may first image one of the emitters of vehicle 12 on both sensors to achieve a locked state and establish a unique match. Knowing the distance between sensors 21 and 22 mounted on vehicle 11 and the relative displacement between the images of the emitter on the detector imaging arrays (i.e., as imaged on individual pixels), the distance between the emitter and the sensors (i.e., the distance between vehicles 11 and 12) can be computed. This procedure can then be repeated for the second, separately coded emitter, thereby increasing the robustness of the distance measurement.

Figure 6:
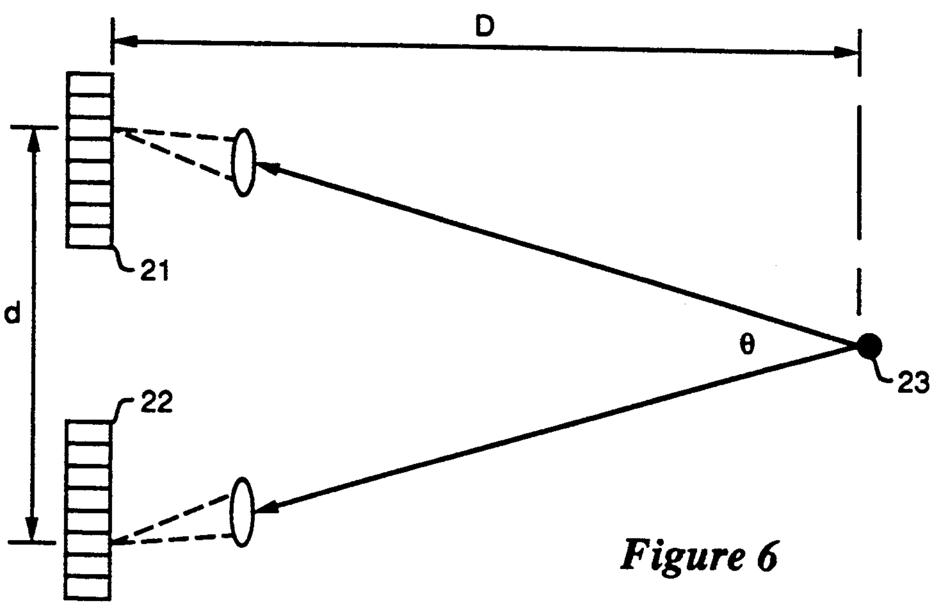
FIG. 6 is a schematic diagram illustrating calculation of distance between emitters and sensors of the present invention.

FIG. 6 illustrates the basic method of computing the distance between emitter 23 and sensors 21 and 22, for example. Light from emitter 23 is imaged on both sensors 21 and 22 to illuminate a specific detector pixel of each sensor. Because the mounting distance between sensors 21 and 22 is known, the distance d between the illuminated pixels can be determined. Furthermore, the specific pixels of sensors 21 and 22 illuminated by emitter 23 are a function of the angle $\theta$. The angle $\theta$, of course, is a function of the distance D of emitter 23 from sensors 21 and 22. Distance D can be computed by processor 26 based on the specific sensor pixels illuminated, which together provide the distance d and the angle $\theta$.

To obtain accurate distance measurements, the system of the present invention must be aligned and calibrated. The preferred embodiment uses two spaced apart sensors that must be mounted on each vehicle a known distance apart, aligned, and calibrated. With this embodiment, the emitter or emitters on the rear of each vehicle require no special alignment or calibration because inter-vehicle distance is a function of the sensor separation. The alternate embodiment, which uses a single sensor and two spaced apart emitters, is less desirable because both the sensor and the pair of emitters must be calibrated. With this embodiment the inter-vehicle distance is a function of the mounting distance between the two emitters, which must be controlled. This is undesirable because each vehicle would have to relay on the correct (i.e., constant) separation distance between emitters on all the other vehicles.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. Apparatus for measuring distance between automotive vehicles, comprising:

a light emitter mounted on the rear of a first vehicle for emitting temporally modulated pulses of light;

two spaced apart light sensors mounted on the front of a second vehicle behind said first vehicle for receiving said temporally modulated pulses of light;

data processing means on said second vehicle for switching said sensors on and off to synchronize said sensors with said received temporally modulated pulses of light and for processing said temporally modulated pulses of light received by said spaced apart sensors to measure distance between said first and second vehicles.

2. The apparatus of claim 1, wherein said light emitter emits temporally modulated pulses of infrared light comprising a code.

3. The apparatus of claim 2, wherein said data processing means synchronizes said sensors to receive and lock on to said code of temporally modulated pulses of infrared light.

4. The apparatus of claim 3, wherein each of said sensors comprises a plurality of detector pixels and a lens system for imaging said temporally modulated pulses of infrared light on individual ones of said detector pixels.

5. The apparatus of claim 1, further comprising:

a plurality of vehicles on an automated highway, each of said vehicles including one of said data processing means connected to one of said light emitters and two of said light sensors; and each of said data processing means driving said connected light emitter to emit said pulses of light in a code selected from a family of orthogonal codes.

6. The apparatus of claim 5, further comprising a plurality of roadside emitters spaced apart along said highway, said roadside emitters emitting temporally modulated pulses of light comprising a code selected from said family of orthogonal codes for communicating with said plurality of vehicles on said highway.

7. Apparatus for measuring distance between automotive vehicles, comprising:

light emitting means mounted on the rear of a first vehicle for emitting temporally modulated pulses of light;

light sensing means mounted on the front of a second vehicle behind said first vehicle for receiving said temporally modulated pulses of light;

data processing means on said second vehicle for switching said light sensing means on and off to synchronize said light sensing means with said received temporally modulated pulses of light and for processing said temporally modulated pulses of light received by said light sensing means to measure distance between said first and second vehicles.

8. The apparatus of claim 7, wherein said light emitting means emits temporally modulated pulses of infrared light comprising a code.

9. The apparatus of claim 8, wherein said code comprises a pseudo-random code and said data processing means synchronizes said sensing means to receive and lock on to said pseudo-random code of temporally modulated pulses of infrared light.

10. The apparatus of claim 7, wherein said sensing means comprises a plurality of detector pixels and a lens system for imaging said temporally modulated pulses of light from said light emitting means on individual ones of said detector pixels.

11. The apparatus of claim 10, further comprising:

a plurality of vehicles on an automated highway, each of said vehicles having one of said data processing means connected to corresponding light emitting means and light sensing means;

each of said data processing means driving said connected light emitting means to emit said pulses of light in a code selected from a family of orthogonal codes; and a plurality of roadside emitters spaced apart along said highway, said roadside emitters emitting temporally modulated pulses of light in a code selected from said family of orthogonal codes for communicating with said plurality of vehicles on said highway.

12. The apparatus of claim 11, further comprising:

at least two of said light emitting means mounted on the rear of each of said plurality of vehicles; and said light sensing means including at least two spaced apart elements mounted on the front of each of said plurality of vehicles.

13. A method of measuring distance between automotive vehicles, comprising the steps of:

emitting temporally modulated pulses of light from light emitting means on the rear of a first vehicle;

receiving said temporally modulated pulses of light with light sensing means on the front of a second vehicle behind said first vehicle;

switching said light sensing means on and off to synchronize said light sensing means with said received temporally modulated pulses of light; and processing said received temporally modulated pulses of light to compute distance between said first and second vehicles.

14. The method of claim 13, wherein the emitting step comprises emitting a code of temporally modulated pulses of infrared light.

15. The method of claim 14, wherein the switching step comprises synchronizing said light sensing means for receiving and locking on to said code of temporally modulated pulses of infrared light.

16. The method of claim 15, further comprising the steps of providing a plurality of detector pixels forming said light sensing means and providing a lens system for imaging said temporally modulated pulses of infrared light on individual ones of said detector pixels.

17. The method of claim 13, further comprising the steps of: providing a plurality of vehicles on an automated highway;

providing each of said vehicles with said light emitting means, said light sensing means, and data processing means connected to said light emitting means and said light sensing means; and driving said light emitting means to emit said temporally modulated pulses of light in a code selected from a family of orthogonal codes.

18. The method of claim 17, further comprising the step of emitting temporally modulated pulses of light from a plurality of roadside emitters spaced apart along said highway, said temporally modulated pulses of light from said roadside emitters comprising a code selected from said family of orthogonal codes for communicating with said plurality of vehicles on said highway.

19. The method of claim 18, wherein the emitting step comprises emitting said temporally modulated pulses of light from said vehicles and said roadside emitters at an infrared wavelength having low attenuation in air and fog.

* * * * *